United States Patent
Guha et al.

(10) Patent No.: US 11,083,034 B2
(45) Date of Patent: Aug. 3, 2021

(54) METHOD AND SYSTEM FOR HANDLING RADIO LINK FAILURE IN MULTI-RAT DUAL CONNECTIVITY SYSTEM

(71) Applicant: Samsung Electronics Co., Ltd., Gyeonggi-do (KR)

(72) Inventors: Shouvik Guha, Bangalore (IN); Fasil Abdul Latheef, Bangalore (IN); Vijay Saha, Bangalore (IN); Venkatesh Munagala, Bangalore (IN)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/513,196

(22) Filed: Jul. 16, 2019

(65) Prior Publication Data

US 2020/0022202 A1    Jan. 16, 2020

(30) Foreign Application Priority Data

Jul. 16, 2018  (IN) ........................ 201841026530 PS
Jul. 15, 2019  (IN) ........................ 201841026530 CS

(51) Int. Cl.
*H04W 76/16*     (2018.01)
*H04W 76/34*     (2018.01)
*H04W 76/19*     (2018.01)

(52) U.S. Cl.
CPC .......... *H04W 76/16* (2018.02); *H04W 76/19* (2018.02); *H04W 76/34* (2018.02)

(58) Field of Classification Search
None
See application file for complete search history.

(56) References Cited

U.S. PATENT DOCUMENTS

| 2014/0369313 A1 | 12/2014 | Li et al. |
| 2016/0057802 A1 | 2/2016 | Lee et al. |
| 2016/0095004 A1 | 3/2016 | Tseng |

(Continued)

FOREIGN PATENT DOCUMENTS

| EP | 2 922 363 | 9/2015 |
| WO | WO 2016/182670 | 11/2016 |
| WO | WO 2018/128572 | 7/2018 |

OTHER PUBLICATIONS

3GPP, 3rd Generation Partnership Project; Technical Specification Group Radio Access Network; Evolved Universal Terrestrial Radio Access (E-UTRA).

(Continued)

*Primary Examiner* — Kouroush Mohebbi
(74) *Attorney, Agent, or Firm* — The Farrell Law Firm, P.C.

(57) ABSTRACT

Embodiments herein disclose a method for handling RLF in a MRDC system comprising a UE connected to a Master Node and at least one Secondary Node (SN). The method includes detecting, by the UE, a radio link failure (RLF) with the master node. Further, the method includes determining, by the UE, whether a Secondary Node termination condition is met. Further, the method includes performing one of: maintaining, by the UE, a connection with the at least one secondary node till the SN termination condition is met in response to determining that the SN termination condition is not met, and releasing, by the UE, the connection with the at least one secondary node in response to determining that the SN termination condition is met.

14 Claims, 18 Drawing Sheets

(56) References Cited

U.S. PATENT DOCUMENTS

2017/0181216 A1* 6/2017 Worrall ................. H04W 76/19
2017/0273095 A1* 9/2017 Heo ....................... H04W 4/80

OTHER PUBLICATIONS

Radio Resource Control (RRC); Protocol Specification (Release 15), 3GPP TS 36.331 V15.2.2, Jun. 2018, 792 pages.
Mediatek Inc., "Need of RLF Report in NR", R2-1810042, 3GPP TSG-RAN2 NR AH#0218, Jul. 2-6, 2018, 3 pages.
International Search Report dated Oct. 23, 2019 issued in counterpart application No. PCT/KR2019/008783, 9 pages.
European Search Report dated Apr. 9, 2021 issued in counterpart application No. 19836975.3-1231, 9 pages.

* cited by examiner

METHOD AND SYSTEM FOR HANDLING RADIO LINK FAILURE IN MULTI-RAT DUAL CONNECTIVITY SYSTEM

CROSS REFERENCE TO RELATED APPLICATION

This application is based on and claims priority under 35 U.S.C. § 119 to Indian Patent Provisional Application No. 201841026530 (PS), filed on Jul. 16, 2018 and Indian Patent Complete Application No. 201841026530 (CS), filed on Jul. 15, 2019, in the Indian Patent Office, the disclosures of which are incorporated by reference herein in their entireties.

BACKGROUND

1. Field

The present disclosure is related to a wireless communication system, and more specifically related to a method and system for handling Radio Link Failure (RLF) in a Multi-RAT dual connectivity (MRDC) system.

2. Description of Related Art

The Third Generation Partnership Project (3GPP) Rel-15 has defined systems/protocol required for MRDC deployment scenarios having interworking of fifth generation new radio (5G-NR) and Long-Term Evolution (LTE). There could be data activity independently handled on LTE and 5G NR in such MRDC deployment. In the MRDC, there will be scenarios where data transfer is happening on a Secondary Node (SN) and a RLF is triggered (radio link control (RLC) max retransmissions, etc.) on a Master Node (MN) due to poor signal conditions or handover is in progress or other Layer-1 (L1) issues. During such issues on the MN, the existing methods expects a user equipment to stop data activity on the SN. This leads to data loss on the SN also even when it would have been able to sustain radio connection/data activity separately.

The LTE 3GPP TS 36.331 specification suggests to perform EN-DC release (i.e. release secondary cell group (SCG) radio bearer configuration) upon 'initiation' of a RRE procedure. The RLF at the UE can happen due to multiple reason. This problem could affect/interrupt data activity for multiple end user scenarios—Enhanced Mobile Broadband (eMBB), Ultra-reliable low latency communication (uRLLC), Voice over Long-Term Evolution (VoLTE) etc.

As per TS 36.331, section 5.3.7 (RRC connection re-establishment), the UE initiates the procedure when one of the following conditions is met
  I. upon detecting radio link failure, in accordance with 5.3.1,
  II. upon handover failure, in accordance with 5.3.5.6,
  III. upon mobility from E-UTRA failure, in accordance with 5.4.3.5,
  IV. upon integrity check failure indication from lower layers concerning SRB1 or SRB2,
  V. upon an RRC connection reconfiguration failure, in accordance with 5.3.5.5, and
  VI. upon an RRC connection reconfiguration failure, in accordance with TS38.331 [82, 5.3.5.5].
  Upon initiation of the procedure, the UE shall
  I. start timer T311,
  II. suspend all RBs, including RBs configured with NR PDCP, except SRB0,
  III. release the entire SCG configuration, if configured, except for the DRB configuration (as configured by drb-ToAddModListSCG), and
  IV. if EN-DC is configured and perform EN-DC release, as specified in TS 38.331[82, 5.3.5.10].

Thus, it is desired to address the above mentioned disadvantages or other shortcomings or at least provide a useful alternative.

SUMMARY

The principal object of the embodiments herein is to provide a method for handling RLF in a MRDC system.

Another object of the embodiments herein is to detect the RLF with the master node.

Another object of the embodiments herein is to determine whether a Secondary Node termination condition is met.

Another object of the embodiments herein is to maintain a connection with the at least one secondary node till the SN termination condition is met in response to determining that the SN termination condition is not met.

Another object of the embodiments herein is to release the connection with the at least one secondary node in response to determining that the SN termination condition is met.

Another object of the embodiments herein is to initiate a timer and a Radio Resource Control (RRC) connection re-establishment procedure at a Physical Data Convergence Protocol (PDCP) layer only for the master node Another object of the embodiments herein is to continue a data activity with the at least one secondary node without releasing the connection till the SN termination condition is met.

Another object of the embodiments herein is to receive information about Data Radio Bearers (DRBs) to be used, for continuing the data activity, from the MN.

Another object of the embodiments herein is to preserve by the master node, a context of a UE for a particular time period.

Accordingly, the embodiments herein disclose a method for handling RLF in a MRDC system comprising a UE connected to a Master Node (MN) and at least one Secondary Node (SN). The method includes detecting, by the UE, a RLF with the master node. Further, the method includes determining, by the UE, whether a Secondary Node termination condition is met. Further, the method includes performing one of: maintaining, by the UE, a connection with the at least one secondary node till the SN termination condition is met in response to determining that the SN termination condition is not met, and releasing, by the UE, the connection with the at least one secondary node in response to determining that the SN termination condition is met.

In an embodiment, the method further includes initiating, by the UE, a timer and a Radio Resource Control (RRC) connection re-establishment procedure at a Physical Data Convergence Protocol (PDCP) layer only for the master node. Further, the method includes continuing a data activity with the at least one secondary node without releasing the connection till the SN termination condition is met.

In an embodiment, the method further includes determining, by the UE, whether the SN termination condition is met. Further, the method includes releasing the connection with the at least one secondary node.

In an embodiment, continuing the data activity with the at least one secondary node includes receiving, by the UE, information about Data Radio Bearers (DRBs) to be used, for continuing the data activity, from the MN, and continuing the data activity with the at least one secondary node using the DRBs indicated by the MN.

In an embodiment, the SN termination condition includes at least one of detection of expiry of a timer, detection of a stop of the timer, reception of a RRC release message at the UE, reception of a re-configuration message at the UE, reception of a new SN configuration, completion of a SN data activity at the SN, and detection of a RLF at the SN.

Accordingly, the embodiments herein disclose a method for handling RLF in a MRDC system comprising a UE connected to a Master Node and at least one SN. The method includes detecting, by the master node, a RLF. Further, the method includes preserving, by the master node, a context of the UE for a particular time period. Further, the method includes continuing, by the master node, a data activity with the at least one secondary node in the MRDC system.

In an embodiment, the method further includes performing, by the master node, a RLF recovery. Further, the method includes determining, by the master node, at least one Data Radio Bearers (DRBs) to be used by the UE in the MRDC system for continuing the data activity from the UE to the SN while the master node is performing the RLF recovery. Further, the method includes indicating, by the master node, the at least one DRB to the UE associated with the master node.

Accordingly, the embodiments herein disclose a method for handling RLF in a MRDC system comprising a user equipment connected to a master node and at least one secondary node (SN). The method includes detecting, by the master node, a RLF. Further, the method includes performing, by the master node, a RLF recovery. Further, the method includes determining, by the master node, at least one DRBs to be used by the UE in the MRDC system for continuing a data activity from the UE to the at least one SN while the master node is performing the RLF recovery.

In an embodiment, the method further includes preserving, by the master node, a context of the UE for a particular time period. Further, the method includes continuing, by the master node, the data activity with at least one secondary node in the MRDC system.

Accordingly, the embodiments herein disclose a method for handling RLF in a MRDC system comprising a UE connected to a master node and at least one secondary node. The method includes performing, by the UE, a data activity at the at least one SN. Further, the method includes detecting, by the UE, an RLF with the master node. The method includes receiving, by the UE, at least one DRBs indicated by the master node. The method includes continuing, by the UE, the data activity with the at least one secondary node using the DRBs indicated by the MN.

In an embodiment, the UE uses the DRBs indicated by the MN to continue the data activity with the at least one secondary node while the MN is performing a RLF recovery.

Accordingly, the embodiments herein disclose a UE for handling RLF in a MRDC system comprising a Master Node and at least one Secondary Node (SN). The UE includes a processor coupled with a memory. The processor is configured to detect the RLF with the master node and determine whether a Secondary Node termination condition is met. Further, the processor is configured to perform one of: maintain a connection with the at least one secondary node till the SN termination condition is not met in response to determining that the SN termination condition is not met, and releasing the connection with the at least one secondary node in response to determining that the SN termination condition is met.

Accordingly, the embodiments herein disclose a master node for handling RLF in a MRDC system comprising a User Equipment connected to the Master Node and at least one Secondary Node (SN). The master node includes a processor coupled with a memory. The processor is configured to detect a radio link failure (RLF) and preserve a context of the UE for a particular time period. The processor is configured to continue a data activity with the at least one secondary node in the MRDC system.

Accordingly, the embodiments herein disclose a master node for handling RLF in a MRDC system comprising a User Equipment connected to the Master Node and at least one Secondary Node (SN). The master node includes a processor coupled with a memory. The processor is configured to detect a RLF and perform a RLF recovery. The processor is configured to determine at least one DRBs to be used by the UE in the MRDC system for continuing a data activity from the UE to the at least one SN while the master node is performing the RLF recovery.

Accordingly, the embodiments herein disclose a UE for handling RLF in a MRDC system comprising a Master Node and at least one Secondary Node (SN). The UE includes a processor coupled with a memory. The processor is configured to perform a data activity at the at least one SN. The processor is configured to detect a RLF with the master node. The processor is configured to receive at least one DRBs indicated by the master node and the processor is configured to continue the data activity with the at least one secondary node using the DRBs indicated by the MN.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This method and system is illustrated in the accompanying drawings, throughout which like reference letters indicate corresponding parts in the various figures. The embodiments herein will be better understood from the following description with reference to the drawings, in which.

DETAILED DESCRIPTION

Figure 1:
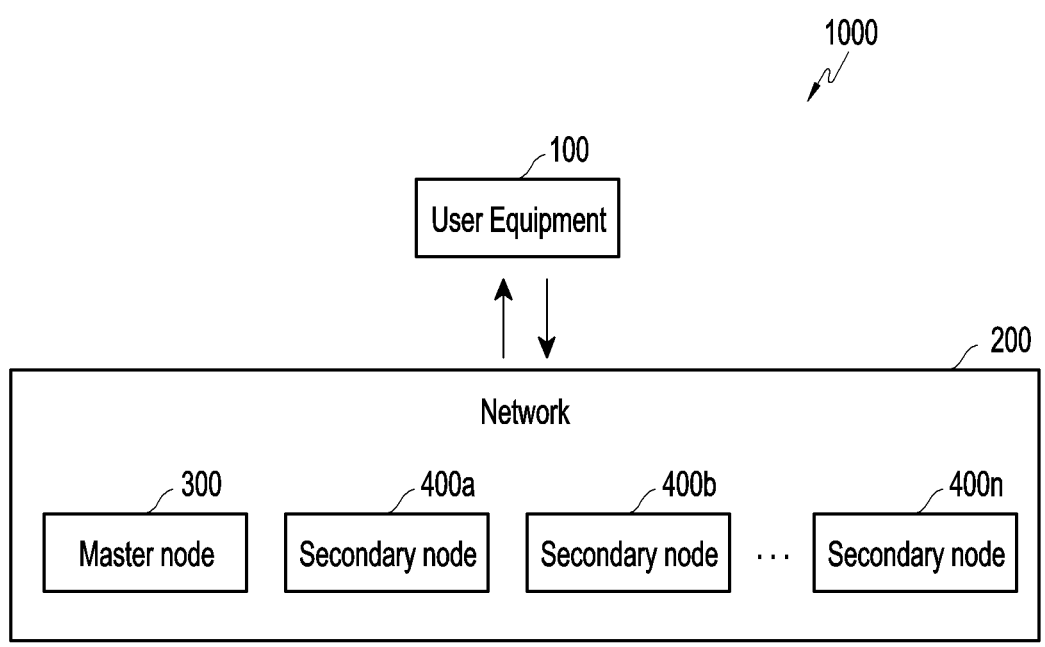
FIG. 1 is a schematic view of a MRDC system for handling a RLF, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method for handling RLF in a MRDC system comprising a UE connected to a Master Node and at least one Secondary Node (SN). The method includes detecting, by the UE, a RLF with the master node. Further, the method includes determining, by the UE, whether a Secondary Node termination condition is met. Further, the method includes performing one of: maintaining, by the UE, a connection with the at least one secondary node till the SN termination condition is met in response to determining that the SN termination condition is not met, and releasing, by the UE, the connection with the at least one secondary node in response to determining that the SN termination condition is met.

Based on the proposed methods, the UE can continue data transfer on the SN even though there is radio connection issue/recovery is ongoing on the MN. The proposed method can be used to provide better user experience in the EN-DC field scenario and reduce the resource wastage on the SN. The proposed method can be used to maintain the data discontinuity on the SN and reduce the latency issues.

Referring now to the drawings, and more particularly to FIGS. 1-9, FIGS. 11-14C, and FIG. 16, where similar reference characters denote corresponding features consistently throughout the figures, there are shown preferred embodiments.

FIG. 1 is a schematic view of a MRDC system (1000) handling a RLF, according to the embodiments as disclosed herein. In an embodiment, the MRDC system (1000) includes a UE (100) connected to a Master Node (300) and at least one Secondary Node (SN) (400a-400n) in a network (NW) (200). The label of the SN is 400. The UE (100) can be, for example but not limited to, a cellular phone, a tablet, a smart phone, a laptop, a Personal Digital Assistant (PDA), a global positioning system, a multimedia device, a video device, an internet of things (IoT) device, smart watch, a game console, or the like. The UE (100) may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The UE (100) is compliant with multiple, different communication protocols that can operate as a multi-mode device by communicating within the 5G system.

In an embodiment, the UE (100) is configured to detect the RLF with the master node (300). After detecting the RLF with the master node (300), the UE (100) is configured to determine the SN termination condition is met. The SN termination condition can be, for example, but not limited to a detection of expiry of a timer (not shown), detection of the stop of the timer, reception of a RRC release message at the UE (100), reception of a re-configuration message at the UE (100), reception of the new SN configuration, completion of the SN data activity at the SN (400), and detection of the RLF at the SN (400).

In response to determining that the SN termination condition is not met, the UE (100) is configured to maintain a connection with the at least one secondary node (400) till the SN termination condition is met. In response to determining that the SN termination condition is met, the UE (100) is configured to release the connection with the at least one secondary node (400).

Further, the UE (100) is configured to initiate the timer and a RRC connection re-establishment procedure at a Packet Data Convergence Protocol (PDCP) layer only for the master node (300). Further, the UE (100) is configured to continue the data activity with the at least one secondary node (400) without releasing the connection till the SN termination condition is met.

Further, the UE (100) is configured to determine whether the SN termination condition is met. If the SN termination condition is met, the UE (100) is configured to release the connection with the at least one secondary node (400).

In an embodiment, the data activity in downlink and uplink are continued on the SN (400) when the MN (300) declares the RLF. In an embodiment, the data activity is continued with the at least one secondary node (400) by receiving information about Data Radio Bearers (DRBs) to be used, for continuing the data activity, from the MN (300).

In another embodiment, the UE (100) is configured to perform the data activity with the at least one SN (400) and detect the RLF with the master node (300). After detecting the RLF with the master node (300), the UE (100) is configured to receive the at least one DRBs indicated by the master node (300). Based on receiving the at least one DRBs, the UE (100) is configured to continue the data activity with the at least one secondary node (400) using the DRBs indicated by the MN (300).

In an embodiment, the UE (100) uses the DRBs indicated by the MN (300) to continue the data activity with the at least one secondary node (400) while the MN (300) is performing the RLF recovery.

Based on the proposed methods, the UE (100) does not release ENDC immediately on detection of the RLF or start of T311 (continue data on the SN (400)). The UE (100) starts T311 and initiates RRE procedure for the MN (300) as the NW 200 is unaware about UE RLF and data on the SN (400) continues. If the SN terminated NR-PDCP is configured, the SN (400) do not suspend data or indicate RLF to NR PDCP. If the MN (300) terminated NR-PDCP is configured for a split bearer, the MN (300) do not suspend the PDCP and continue data activity/normal operation on the PDCP (e.g., Suspend RLC, Rest MAC). The network (200) releases the ENDC on following conditions 1. The UE (100) receives RRCConnectionReestablishment or RRCConnectionReestablishmentReject message (after T301 expiry),
2. The UE (100) receives any SCG release or RRC Re-configuration from the NW 200 (i.e. keep SN connection active till MN re-establishment is completed and it receives new RRC configuration from the NW (200),
3. The RLF/unrecoverable error detected by the UE (100) for SN connection.

The SN (400) can continue to receive data during the RRE procedure is on-going. The proposed method can be used for providing data continuity on the SCG during MCG re-establishment. The network (200) maintains context of the UE (100) which is identified to have RLF for a duration of time slightly larger than the T311 configured to the UE (100) in order to facilitate RLF recovery. However, when the NW (200) declares RLF for the UE (100) over the MN (300), the SN configurations are also released at the network (200). Therefore, till a time this SN configuration is released on the NW (200), the UE (100) still continues data transmission on the SN (400). In an embodiment, the UE (100) does not release ENDC immediately on detection of RLF or start of the T311 (continue data on the SN). Further, the UE (100) starts the T311 and initiates RRE procedure for the MN (300). Further, The UE (100) handles the indications of RLF at PDCP so as to let data continue on the SN (400) (be it PDCP or NR-PDCP) and let it continue. The ENDC releases when T311 stop or expiry (the UE continues to receive data on the SN till then) or/and if the UE (100) receives any SCG Release/Re-config from the NW (200), stops ongoing data and follows the re-configuration. Further, the SN (400) can continue to receive data during the RRE procedure is ongoing.

In case of MRDC, there will be scenarios where data transfer is happening on the SN (400) and the RLF is triggered (RLC max retransmissions, etc.) on MN (300) due to poor signal conditions or handover is in progress. In this scenario, the UE (100) can still retain its radio connection with the SN (400) and continue to have data transfer instead of releasing SN (400). Hence the proposed method in which the UE can have data transfer on the SN (400) even though there is no radio connection with the MN (300).

3GPP specifications define the time between the UE (100) declaring RLF to the time where the RLF recovery is attempted is defined by T311. In active NW (200), T311 is mostly between 2 to 5 seconds (3GPP allows it till 30 sec.) The time at the NW (200) to detect UE RLF eNB is NW implementation specific. For example, (based on one of active NW info.)->2 seconds for Frequency-division duplexing (FDD) and 4 seconds for Time Division Duplex (TDD).

As per International Telecommunications Union (ITU) recommendations for 5G technologies, the average user experienced data rate for eMBB should be at least 100 Mbps. User plane latency for uRLLC should be 1 ms. In typical EN-DC network deployments, the expected configuration is that both these high data rate sessions and low latency sessions are expected to be carried over the NR RAT (mostly as SN).

For uRLLC, there could be significant impact/delay due to RLF interruption. With the proposed solution, the URLLC data transmission/reception would be reduced significantly. This could be life-saver in critical communications.

For VoLTE, split bearer config (esp. duplication), this can reduce VoLTE packet loss/mute with data continuing on SN. The gains could be much more if we consider the recovery on MN taking more time (say RACH Failure etc.)

Figure 2:
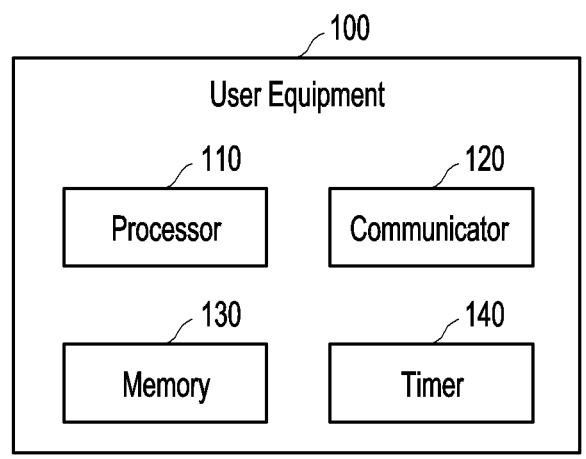
FIG. 2 is a block diagram of a UE, according to the embodiments as disclosed herein.

FIG. 2 is a block diagram of the UE (100), according to the embodiments as disclosed herein. In an embodiment, the UE (100) includes a processor (110), a communicator (120), a memory (130), and a timer (140). The processor (110) is coupled with the communicator (120), the memory (130), and the timer (140).

The processor (110) is configured to detect the RLF with the master node (300). After detecting the RLF with the master node (300), the processor (110) is configured to determine the SN termination condition is met. The SN termination condition can be, for example, but not limited to the detection of expiry of the timer (140), detection of the stop of the timer (140), reception of the RRC release message at the UE (100), reception of a re-configuration message at the UE (100), reception of the new SN configuration, completion of the SN data activity at the SN (400), and detection of the RLF at the SN (400).

In response to determining that the SN termination condition is not met, the processor (110) is configured to maintain the connection with the at least one secondary node (400) till the SN termination condition is met. In response to determining that the SN termination condition is met, the processor (110) is configured to release the connection with the at least one secondary node (400).

Further, the processor (110) is configured to initiate a timer (140) and a RRC connection re-establishment procedure at a PDCP layer only for the master node (300). Further, the processor (110) is configured to continue the data activity with the at least one secondary node (400) without releasing the connection till the SN termination condition is met.

Further, the processor (110) is configured to determine whether the SN termination condition is met. If the SN termination condition is met, the processor (110) is configured to release the connection with the at least one secondary node (400).

The data activity is continued with the at least one secondary node (400) by receiving information about Data Radio Bearers (DRBs) to be used, for continuing the data activity, from the MN (300).

In another embodiment, the processor (110) is configured to perform the data activity at the at least one SN (400) and detect the RLF with the master node (300). After detecting the RLF with the master node (300), the processor (110) is configured to receive the at least one DRBs indicated by the master node (300). Based on receiving the at least one DRBs, the processor (110) is configured to continue the data activity with the at least one secondary node (400) using the DRBs indicated by the MN (300).

In an embodiment, the processor (110) uses the DRBs indicated by the MN (300) to continue the data activity with the at least one secondary node (400) while the MN (300) is performing a RLF recovery.

The processor (110) is configured to execute instructions stored in the memory (130) and to perform various processes. The communicator (120) is configured for communicating internally between internal hardware components and with external devices via one or more networks.

The memory (130) stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In some examples, the memory (130) can be configured to store larger amounts of information than the memory. In certain examples, a non-transitory storage medium may store data that can, over time, change (e.g., in Random Access Memory (RAM) or cache).

Although the FIG. 2 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components can be combined together to perform same or substantially similar function to handle the RLF in the MRDC system (1000).

Figure 3:
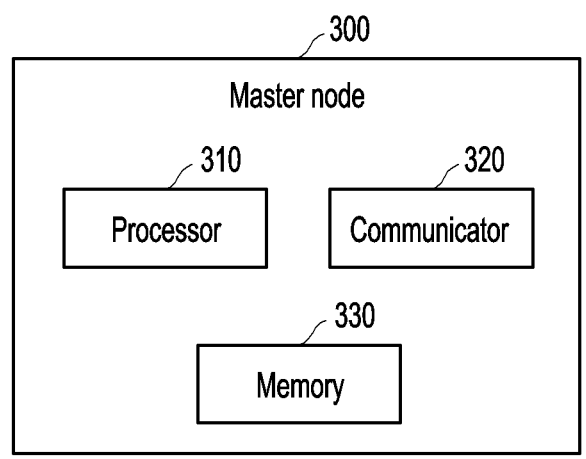
FIG. 3 is a block diagram of a master node, according to the embodiments as disclosed herein.

FIG. 3 is a block diagram of the master node (300), according to the embodiments as disclosed herein. The master node (300) includes a processor (310), a communicator (320), and a memory (330). The processor (310) is coupled with the communicator (320) and the memory (330).

In an embodiment, the processor (310) is configured to detect the RLF. After detecting the RLF, the processor (310) is configured to preserve the context of the UE (100) for the particular time period. Further, the processor (310) is configured to determine whether the SN termination condition is met. If the SN termination condition is not met then, the processor (310) is configured to continue the data activity with the at least one secondary node (400) in the MRDC system (1000) till the SN termination condition is met. If the SN termination condition is met then, the processor (310) is configured to stop the data activity with the at least one secondary node (400)

Further, the processor (310) is configured to perform the RLF recovery and determine at least one DRBs to be used by the UE (100) in the MRDC system (1000) for continuing the data activity from the UE (100) to the at least one SN (400) while the master node (300) is performing the RLF recovery. Further, the processor (310) is configured to indicate the at least one DRB to the UE (100) associated with the master node (300).

The processor (310) is configured to execute instructions stored in the memory (330) and to perform various processes. The communicator (320) is configured for communicating internally between internal hardware components and with external devices via one or more networks.

The memory (330) stores instructions to be executed by the processor (310). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In some examples, the memory (330) can be configured to store larger amounts of information than the memory. In certain examples, a non-transitory storage medium may store data that can, over time, change (e.g., in Random Access Memory (RAM) or cache).

Although the FIG. 3 shows various hardware components of the master node (300) but it is to be understood that other embodiments are not limited thereon. In other embodiments, the master node (300) may include less or more number of components. Further, the labels or names of the components are used only for illustrative purpose and does not limit the scope of the invention. One or more components can be combined together to perform same or substantially similar function to handle the RLF in the MRDC system (1000).

Figure 4:
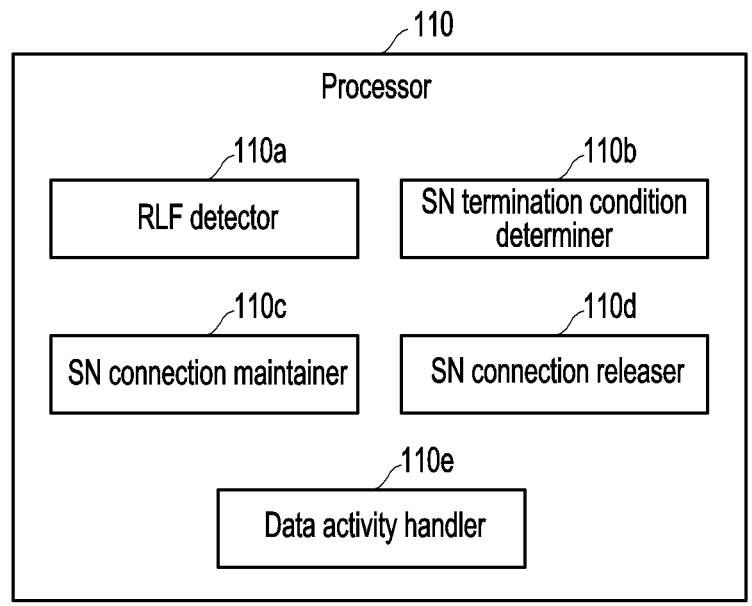
FIG. 4 is a block diagram of a processor included in the UE, according to the embodiments as disclosed herein.

FIG. 4 is a block diagram of the processor (110) included in the UE (100), according to the embodiments as disclosed herein. In an embodiment, the processor (110) includes a RLF detector (110a), a SN termination condition determiner (110b), a SN connection maintainer (110c), a SN connection releaser (110d) and a data activity handler (110e).

The RLF detector (110a) is configured to detect the RLF with the master node (300). After detecting the RLF with the master node (300), the SN termination condition determiner (110b) is configured to determine the SN termination condition is met. In response to determining that the SN termination condition is not met, the SN connection maintainer (110c) is configured to maintain the connection with the at least one secondary node (400) till the SN termination condition is met. In response to determining that the SN termination condition is met, the SN connection releaser (110d) is configured to release the connection with the at least one secondary node (400)

Further, the data activity handler (110e) is configured to initiate the timer (140) and the RRC connection re-establishment procedure at the PDCP layer only for the master node (300). Further, the data activity handler (110e) is configured to continue the data activity with the at least one secondary node (400) without releasing the connection till the SN termination condition is met. The data activity is continued with the at least one secondary node (400) by receiving information about Data Radio Bearers (DRBs) to be used, for continuing the data activity, from the MN (300).

In another embodiment, the data activity handler (110e) is configured to perform the data activity at the at least one SN (400) and detect the RLF with the master node (300). After detecting the RLF with the master node (300), the data activity handler (110e) is configured to receive the at least one DRBs indicated by the master node (300). Based on receiving the at least one DRBs, the data activity handler (110e) is configured to continue the data activity with the at least one secondary node (400) using the DRBs indicated by the MN (300).

In an embodiment, the data activity handler (110e) uses the DRBs indicated by the MN (300) to continue the data activity with the at least one secondary node (400) while the MN (300) is performing the RLF recovery.

Although the FIG. 4 shows various hardware components of the processor (110) but it is to be understood that other embodiments are not limited thereon. In other embodiments, the processor (110) may include less or more number of components. Further, the labels or names of the components are used only for illustrative purpose and does not limit the scope of the invention. One or more components can be combined together to perform same or substantially similar function to handle the RLF in the MRDC system (1000).

Figure 5:
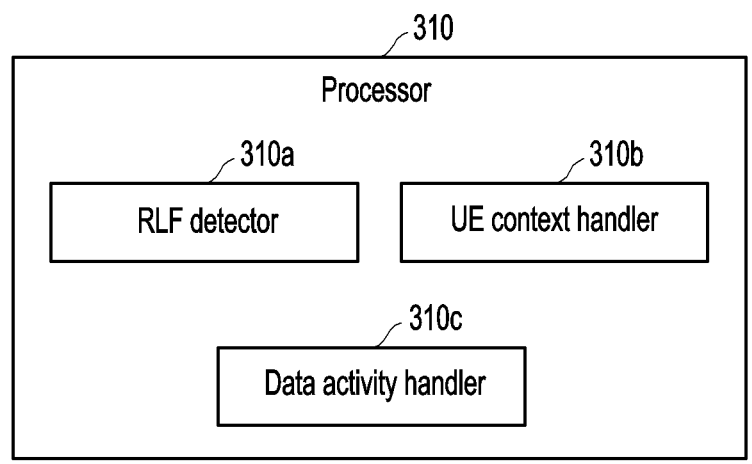
FIG. 5 is a block diagram of a processor included in the master node, according to the embodiments as disclosed herein.

FIG. 5 is a block diagram of the processor (310) included in the master node (300), according to the embodiments as disclosed herein. The processor (310) includes a RLF detector (310a), a UE context handler (310b) and a data activity handler (310c).

In an embodiment, the RLF detector (310a) is configured to detect the RLF. After detecting the RLF, the UE context handler (310b) is configured to preserve the context of the UE (100) for the particular time period. Further, the data activity handler (310c) is configured to determine whether the SN termination condition is met. If the SN termination condition is not met then, the data activity handler (310c) is configured to continue the data activity with the at least one secondary node (400) in the MRDC system (1000) till the SN termination condition is met. If the SN termination condition is met then, the data activity handler (310c) is configured to stop the data activity with at least one secondary node (400)

Further, the data activity handler (310c) is configured to perform the RLF recovery and determine at least one DRBs to be used by the UE (100) in the MRDC system (1000) for continuing the data activity from the UE (100) to the at least one SN (400) while the master node (300) is performing the RLF recovery. Further, the data activity handler (310c) is configured to indicate the at least one DRB to the UE (100) associated with the master node (300), wherein the at least one DRB is indicated to the UE (100).

Although the FIG. 5 shows various hardware components of the processor (310) but it is to be understood that other embodiments are not limited thereon. In other embodiments, the processor (310) may include less or more number of components. Further, the labels or names of the components are used only for illustrative purpose and does not limit the scope of the invention. One or more components can be combined together to perform same or substantially similar function to handle the RLF in the MRDC system (1000).

Figure 6:
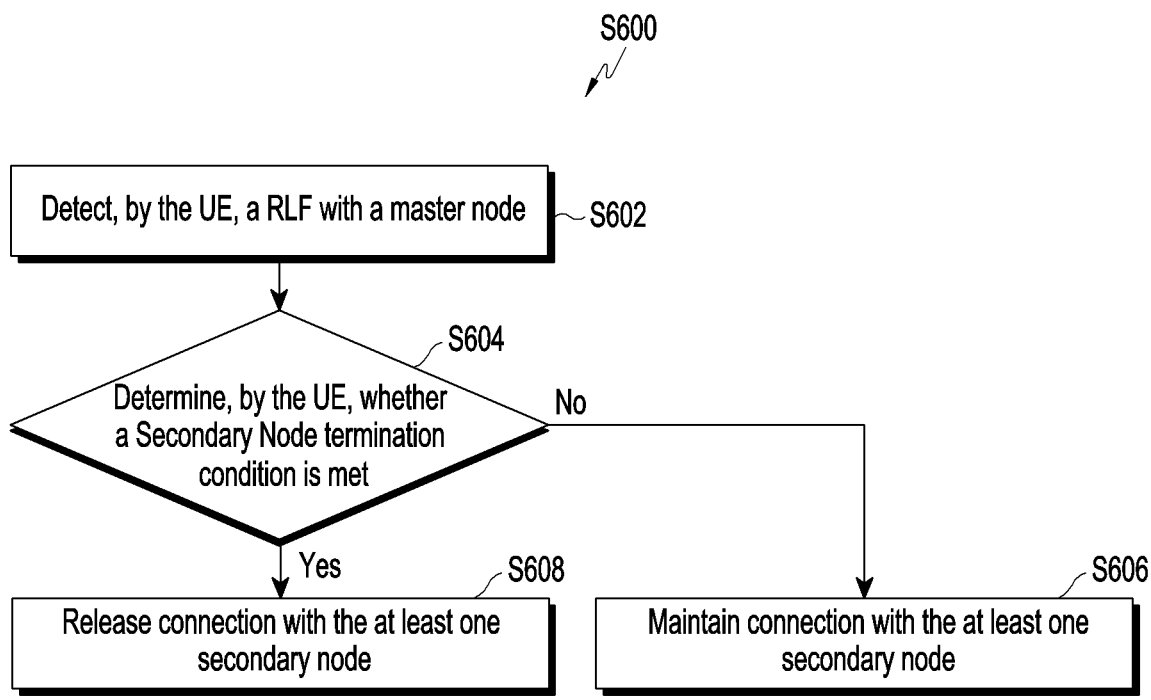
FIG. 6 and FIG. 7 are flow diagrams illustrating various operations, implemented by the UE, for handling RLF in the MRDC system, according to the embodiments as disclosed herein.
Figure 7:
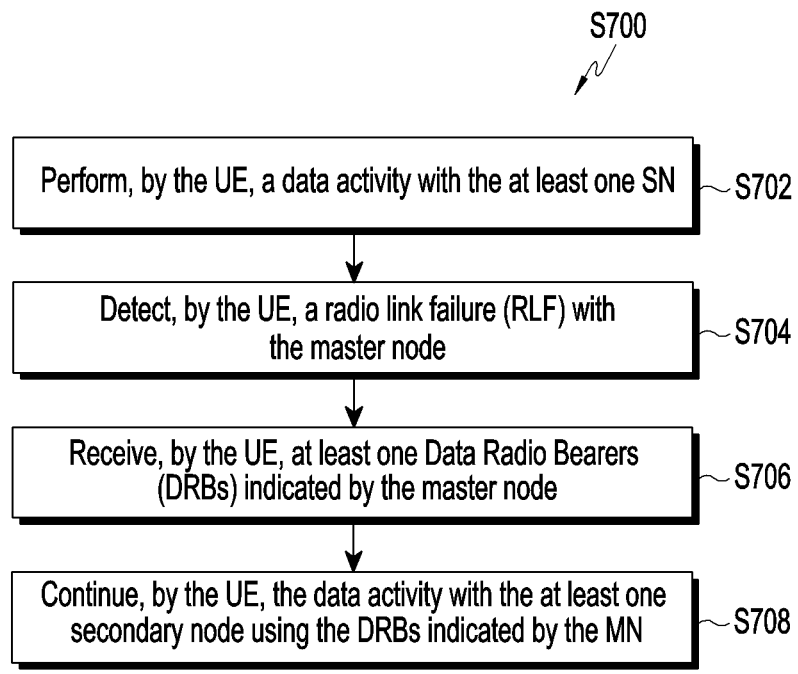

FIG. 6 and FIG. 7 are flow diagrams (S600 and S700) illustrating various operations, implemented by the UE (100), for handling RLF in the MRDC system (1000), according to the embodiments as disclosed herein.

As shown in the FIG. 6, the operations (602-608) are handled by the processor (110). At S602, the method includes detecting the RLF with the master node (300). At S604, the method includes determining whether the Secondary Node termination condition is met. If the SN termination condition is not met then, at S606, the method includes maintaining the connection with the at least one secondary node (400) till the SN termination condition is met. If the SN termination condition is met then, at S608, the method includes releasing the connection with the at least one secondary node (400).

As shown in the FIG. 7, the operations (702-708) are handled by the processor (110). At S702, the method includes performing the data activity at the at least one SN (400). At S704, the method includes detecting the RLF with the master node (300). At S706, the method includes receiving the at least one DRBs indicated by the master node (300). At S708, the method includes continuing the data activity with the at least one secondary node (400) using the DRBs indicated by the MN (300).

Figure 8:
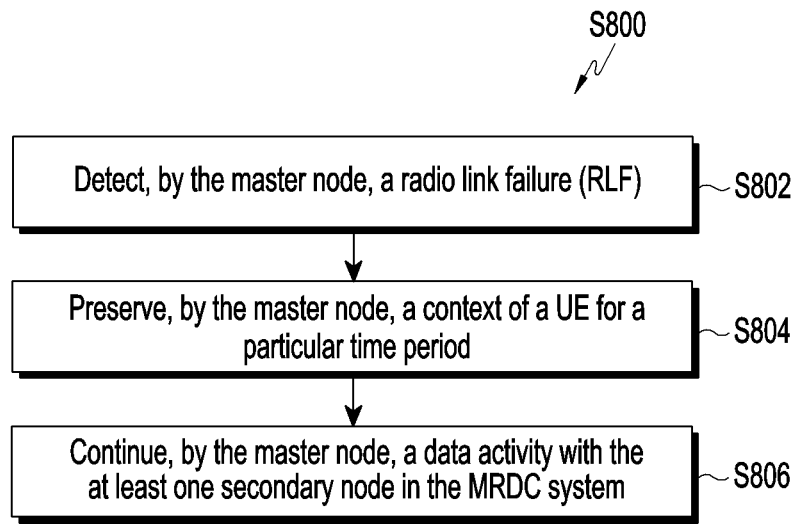
FIG. 8 and FIG. 9 are flow diagrams illustrating various operations, implemented by the master node, for handling RLF in the MRDC system, according to the embodiments as disclosed herein.
Figure 9:
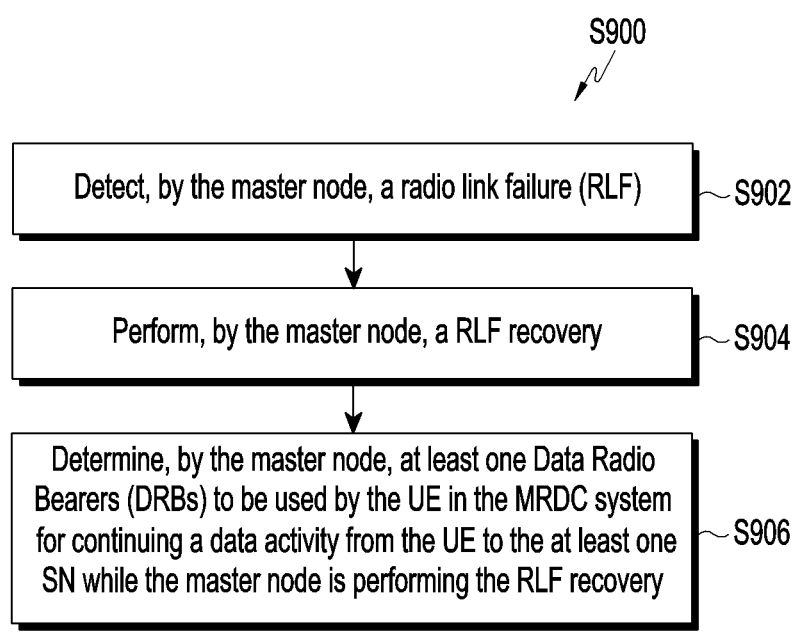

FIG. 8 and FIG. 9 are flow diagrams (S800 and S900) illustrating various operations, implemented by the master node (300), for handling RLF in the MRDC system (1000), according to the embodiments as disclosed herein.

As shown in the FIG. 8, the operations (802-806) are handled by the processor (310). At S802, the method includes detecting the RLF. At S804, the method includes preserving the context of the UE (100) for a particular time period. At S806, the method includes continuing the data activity with the at least one secondary node (400) in the MRDC system (1000).

As shown in the FIG. 9, the operations (902-906) are handled by the processor (310). At S902, the method includes detecting the RLF. At S904, the method includes performing the RLF recovery. At S906, the method includes determining the at least one DRBs to be used by the UE (100) in the MRDC system (1000) for continuing the data activity from the UE (100) to the at least one SN (400) while the master node (300) is performing the RLF recovery.

The various actions, acts, blocks, steps, or the like in the flow diagrams 600-900 may be performed in the order presented, in a different order or simultaneously. Further, in some embodiments, some of the actions, acts, blocks, steps, or the like may be omitted, added, modified, skipped, or the like without departing from the scope of the invention.

Figure 10:
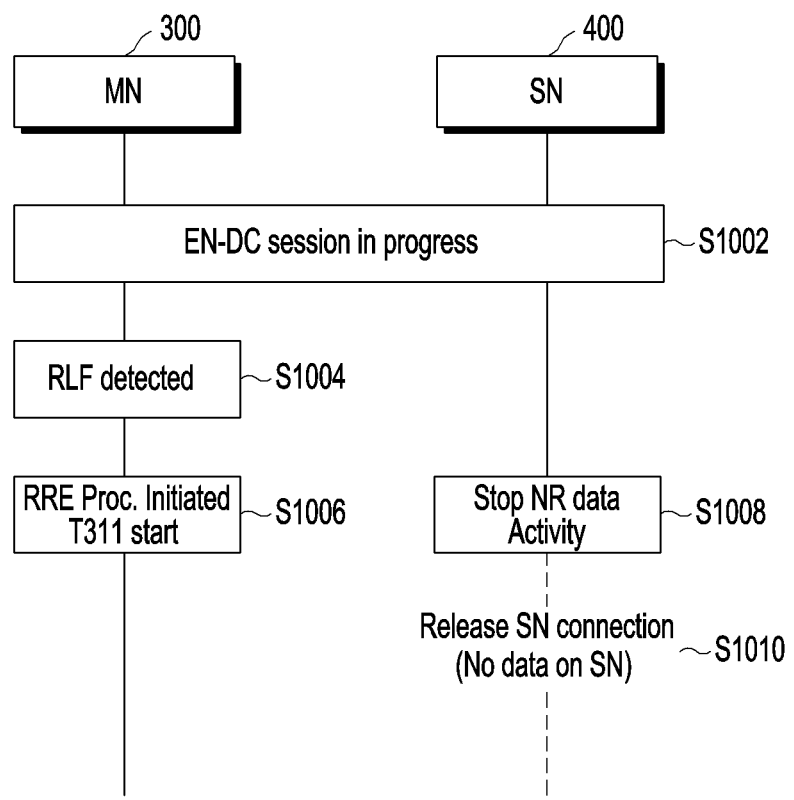
FIG. 10 is a sequential diagram illustrating various operations for handling the RLF in the MRDC system, according to a prior art.

FIG. 10 is a sequential diagram illustrating various operations for handling the RLF in the MRDC system, according to a prior art.

Consider a scenario in which when data transfer is happening on the SN (400) and the RLF is triggered on the MN (300) due to poor signal conditions or handover is in progress. Based on the existing methods, when the RLF is declared by the UE (100) and the network (200) is not aware the poor signal conditions or handover at the same time. The network (200) detects about the UE RLF based on RLF recovery attempt from the UE (100) via the RRC connection re-establishment. The network (200) declares RLF for the UE (100) based on a UL inactivity from the UE (100). The factors considered here may vary between operators and eNB vendors. They may include the UE UL inactivity and TA timer expires multiple times. The UE UL inactivity over configured periodic feedback to the NW like CSI, SRS etc.

During this time, the network (200) maintains context of the UE (100) which is identified to have RLF for a duration of time slightly larger than the T311 configured to the UE (100) in order to facilitate RLF recovery. However, when the NW (200) declares RLF for the UE (100) over the MN (300), the SN configurations are also released at the network (200). Therefore, till the time this SN configuration is released on the NW (200), the UE (100) can still continue data transmission on the SN.

At S1002, the EN-DC session in progress between the MN (300) and SN (400). At S1004, the MN (300) detects the RLF. At S1006, the MN (300) performs the RRE procedure and initiates the T311 start operations. At S1008, the SN (400) stops the NR data activity. At S1010, the SN (400) releases the SN connection (i.e., no data on the SN (400)).

Figure 11:
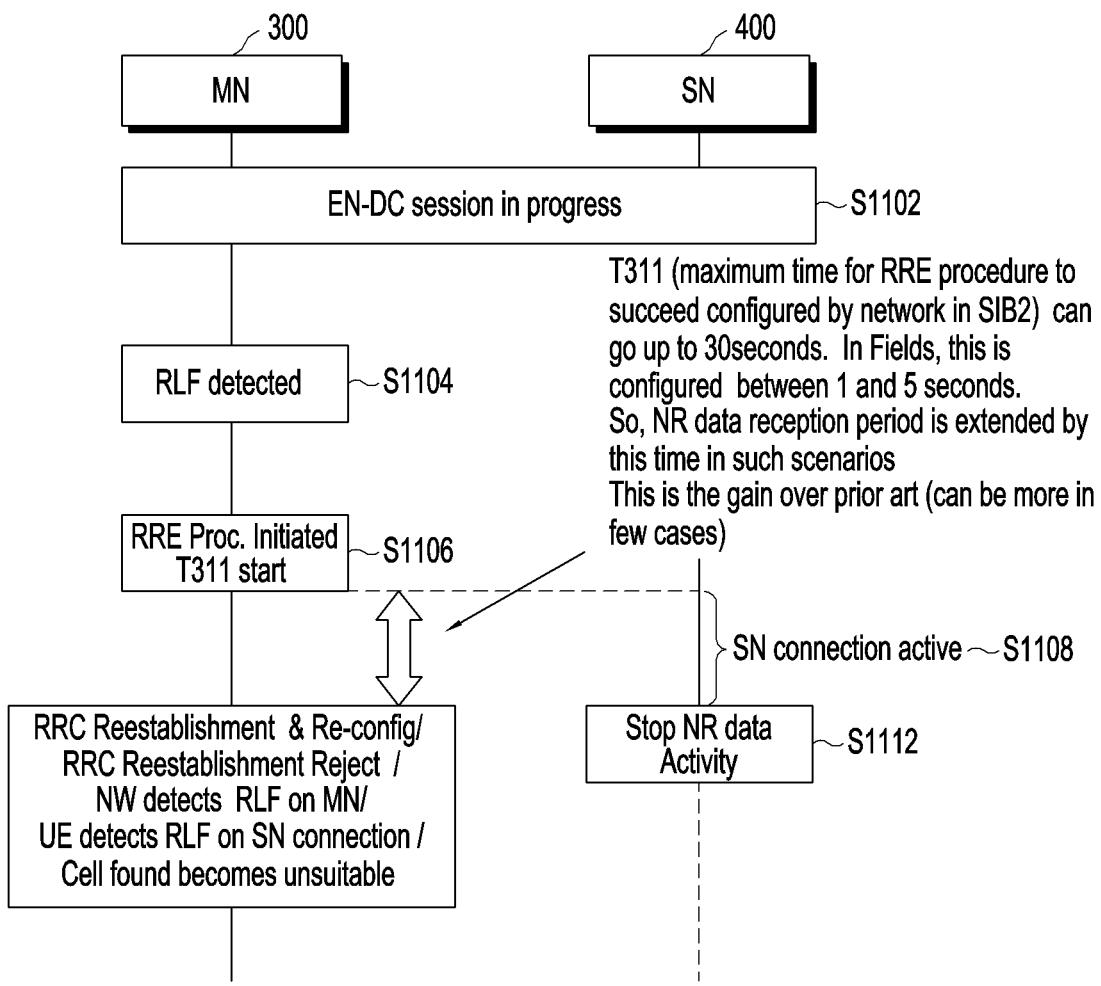
FIG. 11 is a sequential diagram illustrating various operations for handling the RLF in the MRDC system, according to the embodiments as disclosed herein.

FIG. 11 is a sequential diagram illustrating various operations for handling the RLF in the MRDC system (1000), according to the embodiments as disclosed herein.

Based on the proposed methods, the UE (100) does not release EN-DC immediately on detection of RLF or start of T311 (continue data on SN). Further, the UE (100) starts T311 and initiates RRE procedure for the MN (300) (i.e., the NW (200) is unaware about UE RLF and data continues on the SN (400)). Further, the UE (100) handles the indications of RLF at PDCP so as to let data continue on the SN (be it PDCP or NR-PDCP) and let it continue.

The ENDC releases when T311 stop or expiry (UE continues to receive data on SN till then) or/and if UE receives any SCG Release/Re-configuration from NW, stop ongoing data and follow re-configuration. Further, the SN can continue to receive data during the RRE procedure is ongoing.

This method is not dependent on NW changes or 3GPP spec changes. This can be commercial solution.

Consider a scenario, in MRDC, if the UE (100) is availing data services on the SN (400) and the RLF is triggered on the MN (300) or there is inter-MN handover (TBD: shall we keep HO or not) in progress then the UE (100) can still retain radio connection with SN and continue to have data transfer on the SN. When the UE (100) finds a suitable MN cell after cell selection, then the UE (100) can perform re-establish procedure and the new serving cell can retrieve the UE context from old MN cell. This will help in data continuity in UE. For old MN cell, upon which RLF is triggered, to help new MN cell to retrieve UE context it has to maintain UE context till expiry of extended T304 and T311 timers, or till SCG radio link also fails.

The old MN cell (on which RLF is triggered) should store the UE context for a time period given by the sum of extended T304 and T311 timers. During the extended T304 and T311, UE can attempt to complete HO or multiple RRE (depending on the reason of RRE failure). This would help new MN cell to retrieve UE context.

The UE (100) will continue to have data transfer on the SN (400). If RLF happens on the SN (400) due to poor radio conditions or for any other reason, then the SN (400) can send that indication to the MN (300). This can be new X2 message transferor SgNB release request. Then MN (300) can release UE context after receiving the RLF indication from SN (400), if MCG radio link is not present. So, the old MN cell (on which RLF is triggered) should store the UE context for a time period till both MCG and SCG radio links are failed unlike at present where MCG failure would trigger UE context to be removed.

The network (200) indicates to the UE regarding SCG DRBs which need not be removed when MCG encounters RLF. This can be a new IE introduced in SCG radio bearer configuration.

At S1102, the EN-DC session in progress between the MN (300) and SN (400). At S1104, the MN (300) detects the RLF. At S1106, the MN (300) performs the RRE procedure and initiates the T311 start.

In an example, T311 (maximum time for RRE procedure to succeed configured by network in SIB2) can go up to 30 seconds, so that the NR data reception period is extended by the timer (140) to avoid the RLF in the MRDC system (1000). At S1108, the SN connection is active based on the proposed method. At 1110, the MN (300) determines that the Secondary Node termination condition is met. If the Secondary Node termination condition is met then, at S1112, the SN (400) stops the NR data activity and SN (400) releases the SN connection (i.e., no data on the SN (400)).

Figure 12A:
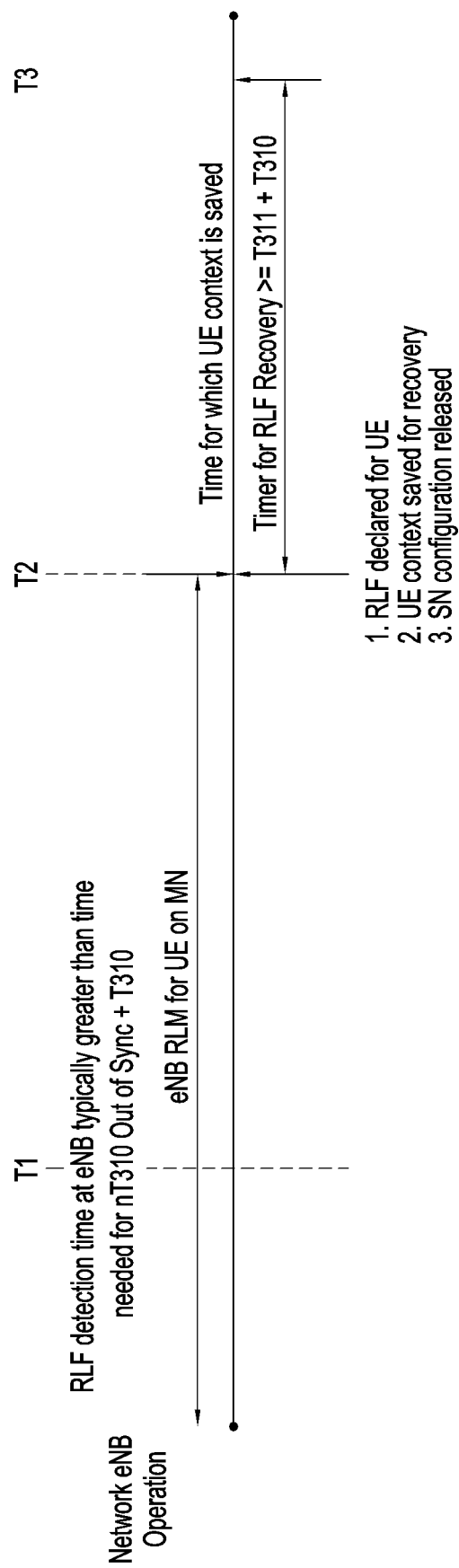
FIG. 12A shows how the MN uses its proprietary a RLM procedure to detect RLF, according to the embodiments as disclosed herein.

FIG. 12A shows how MN (300) uses its proprietary a Radio Link Monitoring (RLM) procedure to detect RLF, according to the embodiments as disclosed herein. The MN (300) continues to preserve the UE context while the RLF recovery (between T2 to T3) is in progress based on T311 & T310 timer. The RLF detection time at the eNB typically greater than time needed for nT310 Out of Sync+T310.

Figure 12B:
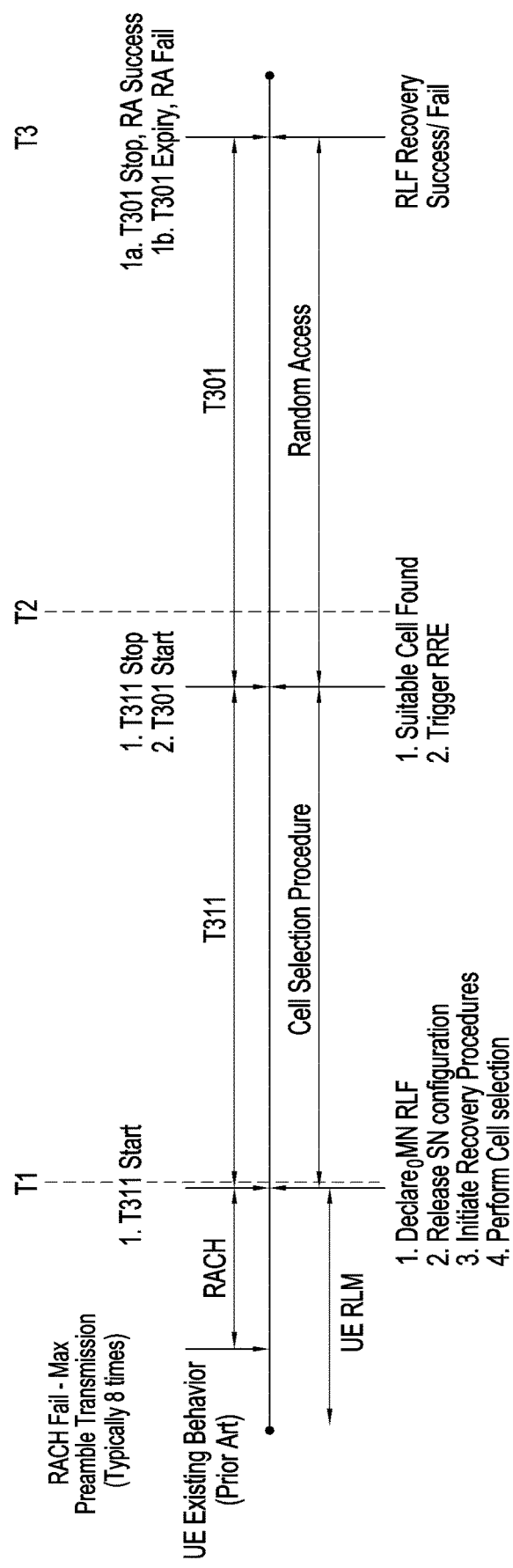
FIG. 12B shows how the UE behaves after the UE detects RLF due to RACH failure on the MN, according to prior art.

FIG. 12B shows how UE (100) behaves after the UE (100) detects the RLF due to RACH failure on the MN (300), according to prior art. The UE (100) releases the SN configuration after detecting RLF on the MN (300) at T1. The UE (100) does not receive any data over the SN (400) after T1. The UE (100) initiates the recovery procedures and performs the cell selection to find the suitable cell. Once the suitable cell is found, the T311 is stopped and T301 is started for triggering RRE at T2. The UE (100) indicates the RLF Recovery Success/Fail at T3.

Figure 12C:
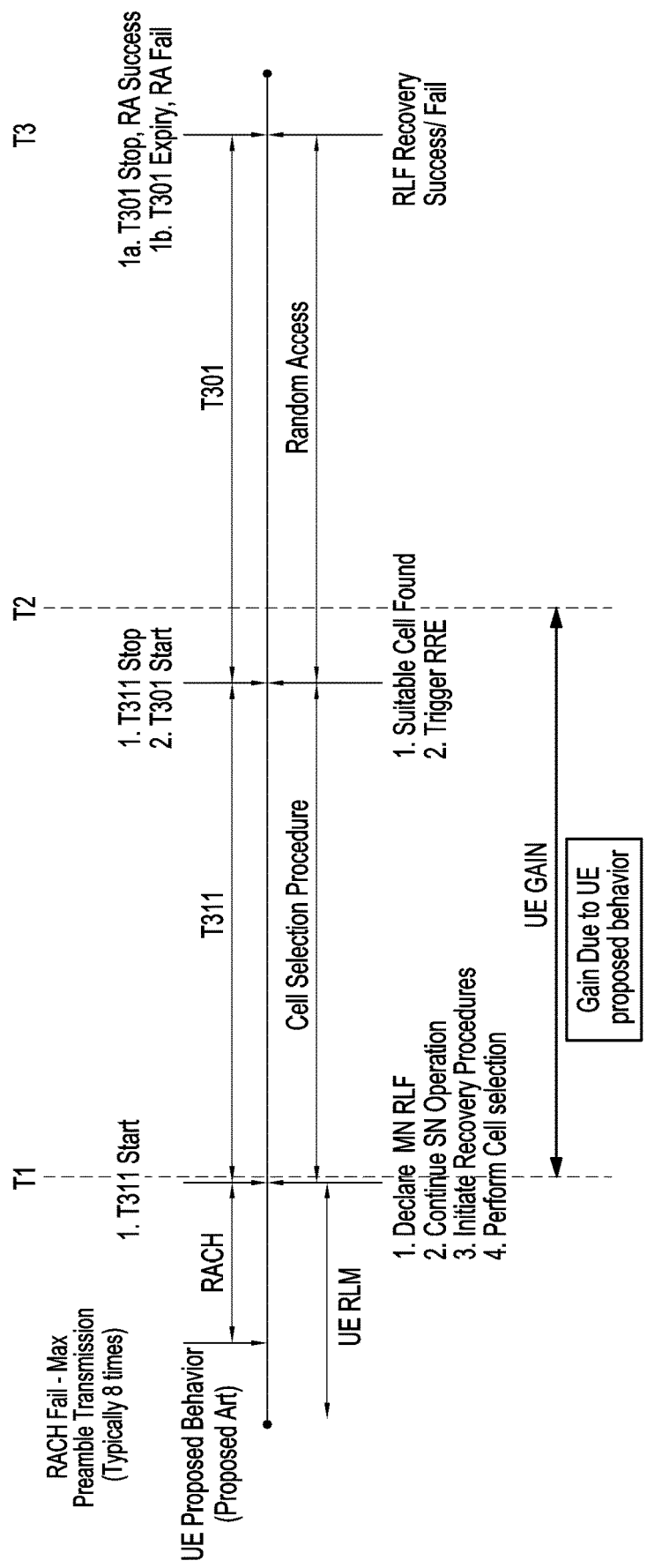
FIG. 12C shows how the UE behaves after the UE detects RLF due to RACH failure on the MN, according to the embodiments as disclosed herein.

FIG. 12C shows how the UE (100) behaves after the UE (100) detects the RLF due to RACH failure on the MN (300), according to the embodiments as disclosed herein. The UE (100) does not releases SN configuration after detecting RLF on the MN (300) at T1. The UE (100) continues to receive data over the SN (400) between T1 and T2. The UE (100) initiates the recovery procedures and performs the cell selection to find the suitable cell. Once the suitable cell is found, the T311 is stopped and T301 is started for triggering a RRC connection re-establishment (RRE) at T2. The UE (100) indicates the RLF Recovery Success/Fail at T3. The T301 stops when the radio access (RA) is successful and the T301 expires when RA fails.

Figure 13A:
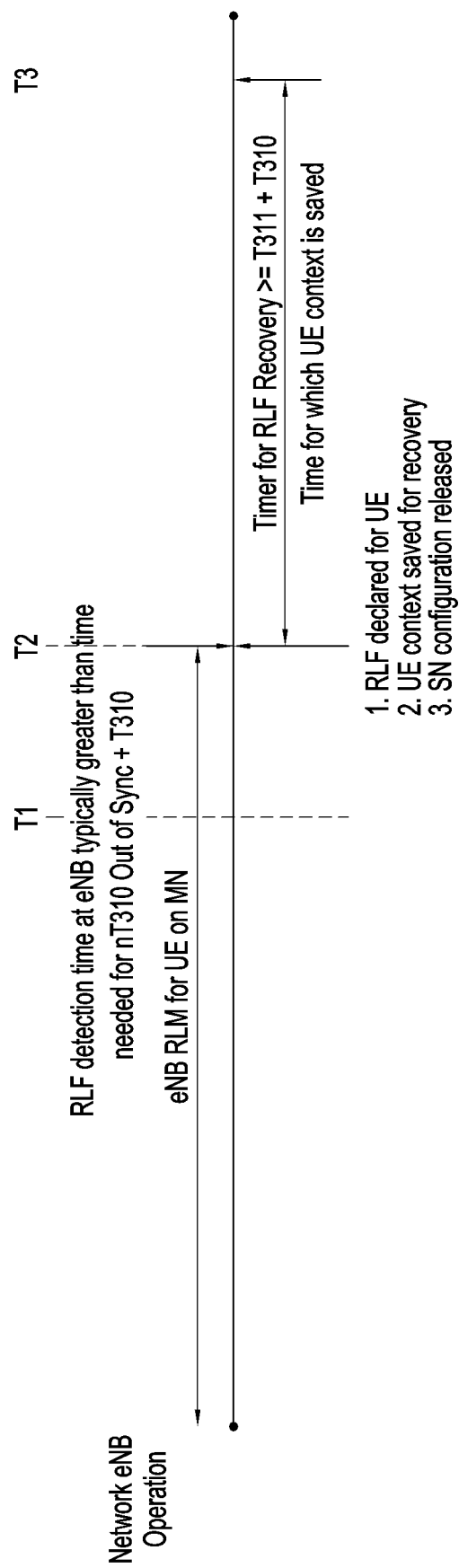
FIG. 13A shows how the MN uses its proprietary RLM procedure to detect the RLF, according to the embodiments as disclosed herein.

FIG. 13A shows how the MN (300) uses its proprietary RLM procedure to detect the RLF, according to the embodiments as disclosed herein. The MN (300) continues to preserve the UE context while RLF recovery (between T2 to T3) is in progress base on T311 & T310 timer. T2 is the time when the MN (300) detected RLF and waits for a MN link to recover via re-establishment. The RLF detection time at the eNB typically greater than time needed for nT310 Out of Sync+T310.

Figure 13B:
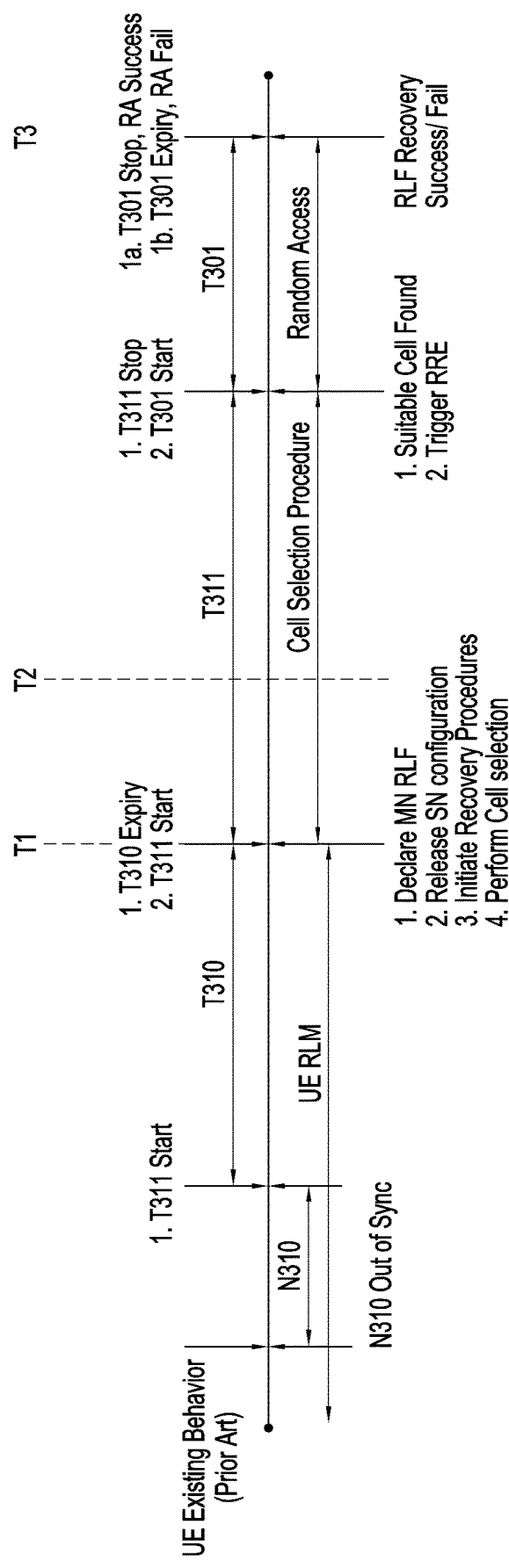
FIG. 13B shows how the UE behaves after the UE detects RLF due to T310 expiry on the MN, according to the prior art.

FIG. 13B shows how the UE (100) behaves after the UE (100) detects RLF due to T310 expiry on the MN (300), according to the prior art. Consider, the N310 is out of synchronization state, the UE (100) releases the SN configuration after detecting RLF on the MN (300) at T1. The UE (100) does not receive any data over the SN (400) after T1. The UE (100) initiates the recovery procedures and performs the cell selection to find the suitable cell. Once the suitable cell is found, the T311 is stopped and T301 is started for triggering the RRE. The UE (100) indicates the RLF Recovery Success/Fail at T3. The UE (100) indicates the RLF Recovery Success/Fail at T3. The T301 stops when the RA is successful and the T301 expires when the RA fails.

Figure 13C:
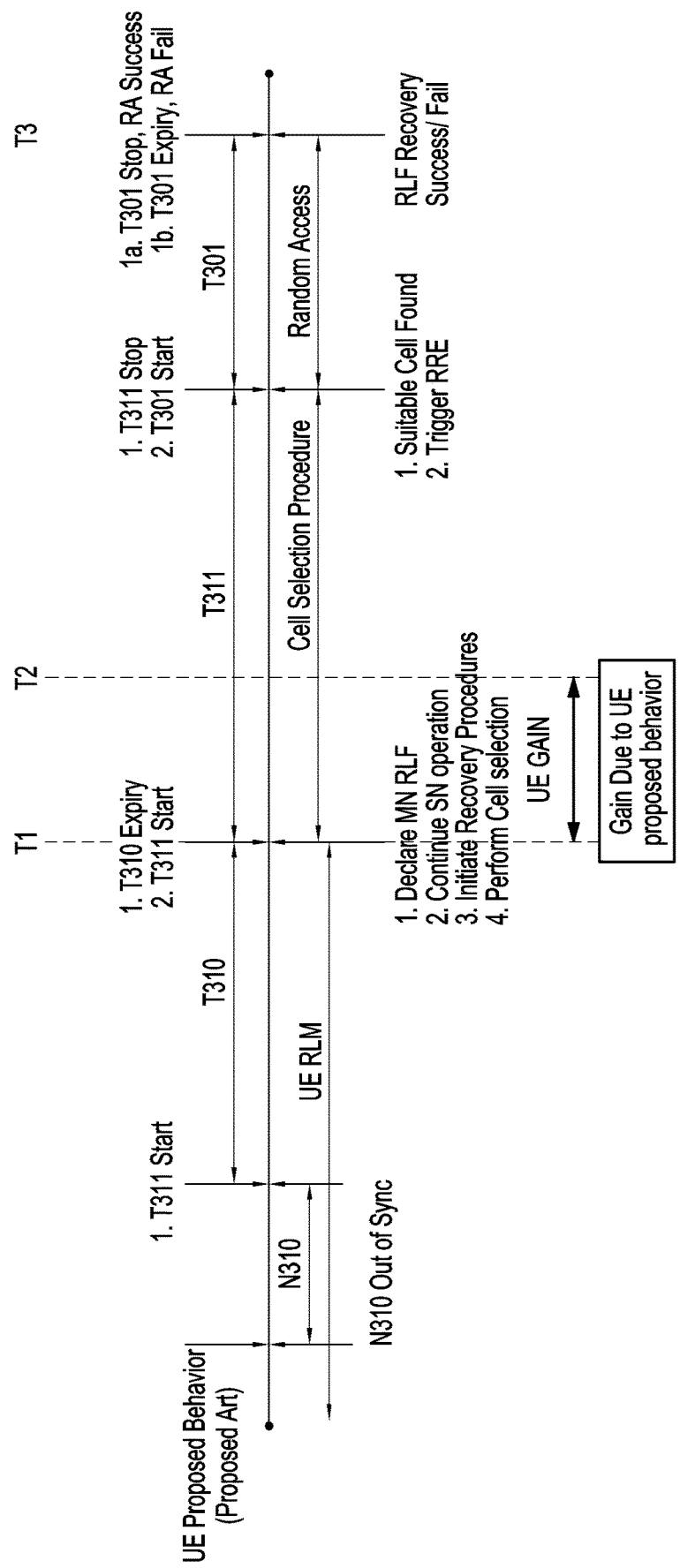
FIG. 13C shows how the UE behaves after the UE detects RLF due to T310 expiry on the MN, according to the embodiments as disclosed herein.

FIG. 13C shows how the UE (100) behaves after the UE (100) detects RLF due to T310 expiry on the MN (300), according to the embodiments as disclosed herein. Consider, the N310 is out of synchronization state, the UE (100) does not releases SN configuration after detecting RLF on the MN (300) at T1. The UE (100) continues to receive data over SN between T1 and T2. The UE (100) initiates the recovery procedures and performs the cell selection to find the suitable cell. Once the suitable cell is found, the T311 is stopped and T301 is started for triggering RRE. The UE (100) indicates the RLF recovery success/fail at T3. The UE (100) indicates the RLF Recovery Success/Fail at T3. The T301 stops when the RA is successful and the T301 expires when the RA fails.

Figure 14A:
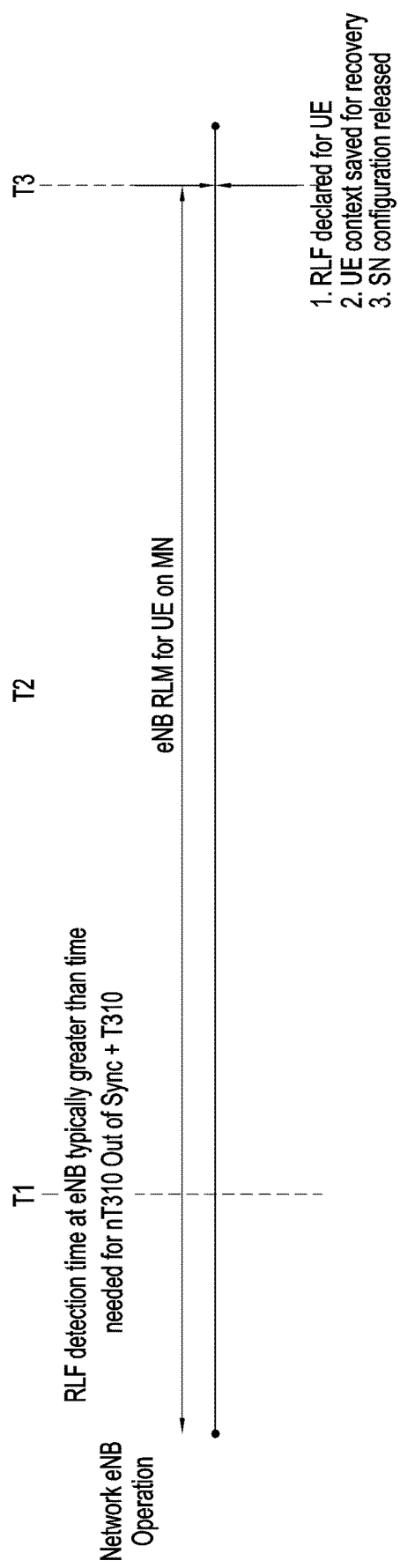
FIG. 14A shows how MN uses its proprietary RLM procedure to detect RLF, according to the embodiments as disclosed herein.

FIG. 14A shows how MN (300) uses its proprietary RLM procedure to detect the RLF, according to the embodiments as disclosed herein. The MN (300) continues to preserve the UE context while RLF recovery (between T2 to T3) is in progress base on T311 & T310 timer. T2 is the time when the MN (300) detected RLF and waits for the MN link to recover via re-establishment. The RLF detection time at the eNB typically greater than time needed for nT310 Out of Sync+T310.

Figure 14B:
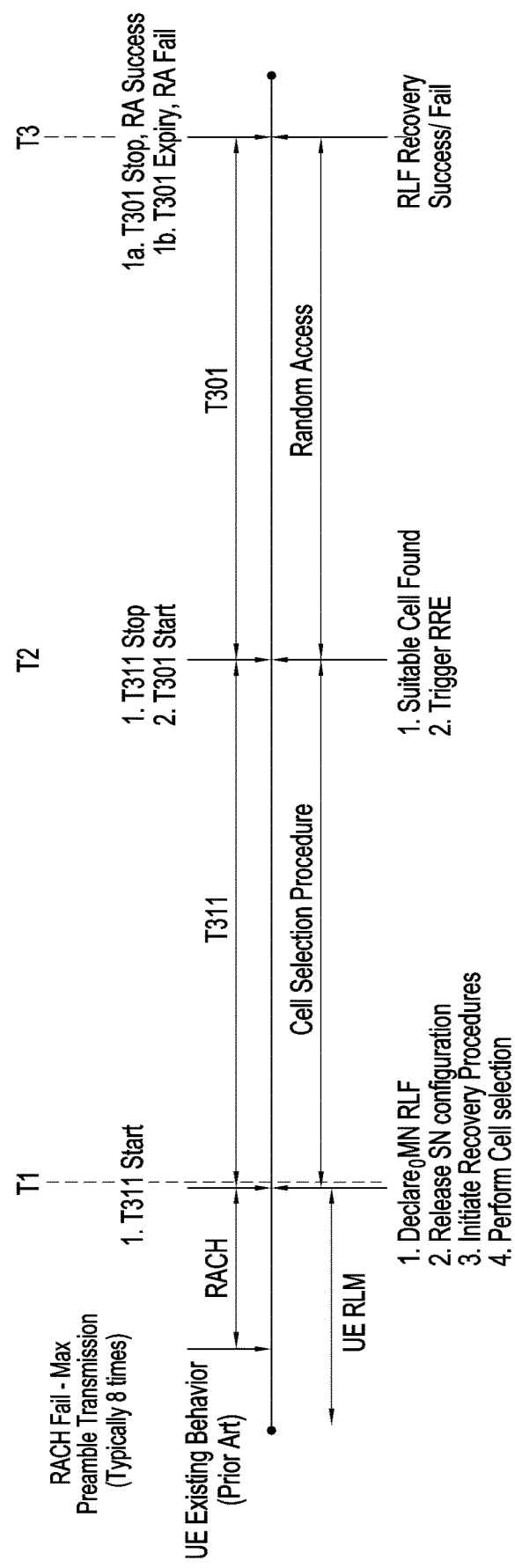
FIG. 14B shows how UE behaves after the UE detects RLF due to other protocol failure on MN, according to the prior art.

FIG. 14B shows how UE (100) behaves after the UE (100) detects RLF due to other protocol failure on MN, according to the prior art. The UE (100) releases SN configuration after detecting RLF on MN at T1. The UE (100) does not receive any data over SN after T1. Consider, the N310 is out of synchronization state. The UE (100) initiates the recovery procedures and performs the cell selection to find the suitable cell. Once the suitable cell is found, the T311 is stopped and T301 is started for triggering RRE. The UE (100) indicates the RLF Recovery Success/Fail at T3. The UE (100) indicates the RLF Recovery Success/Fail at T3. The T301 stops when RA is successful and the T301 expires when RA fails.

Figure 14C:
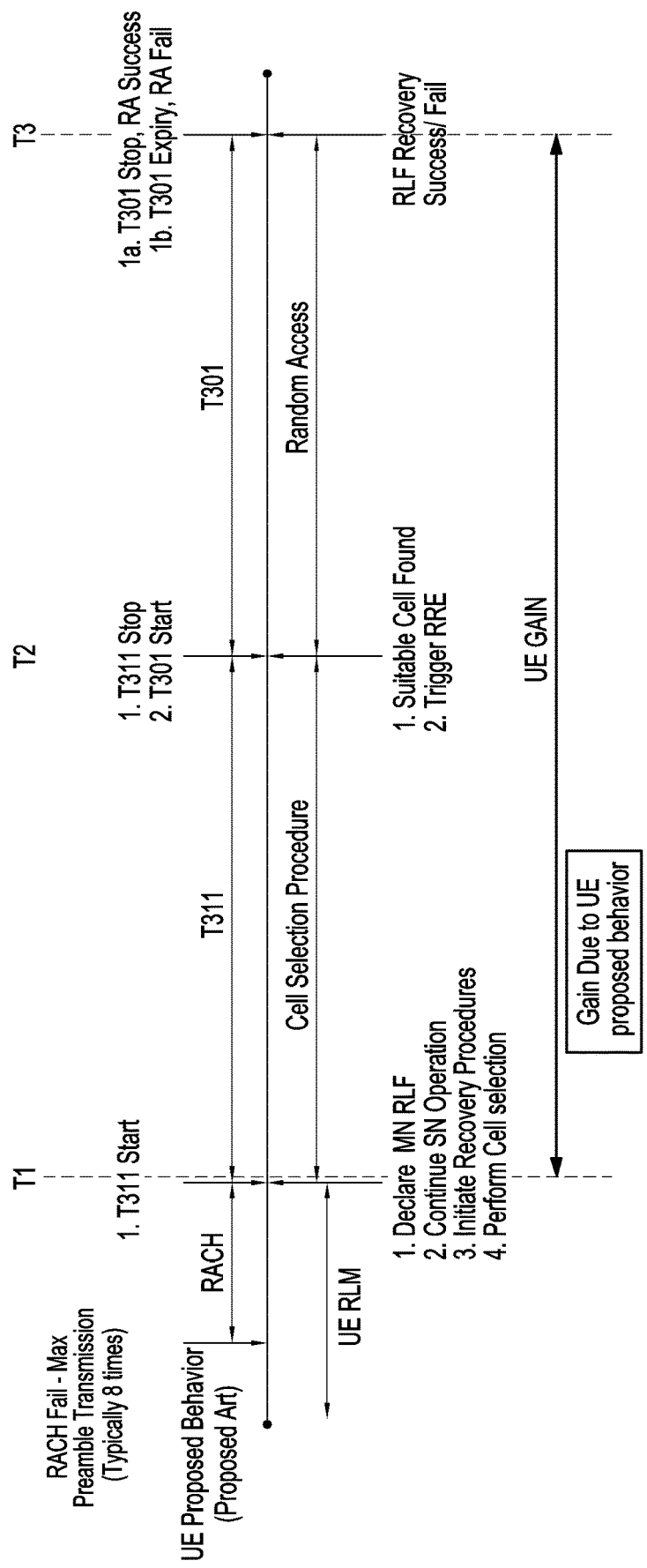
FIG. 14C shows how UE behaves after the UE detects RLF due to other protocol failure on MN, according to the embodiments as disclosed herein.

FIG. 14C shows how UE (100) behaves after the UE (100) detects RLF due to other protocol failure on the MN (300), according to the embodiments as disclosed herein. The UE (100) does not releases SN configuration after detecting RLF on the MN (300) at T1. The UE (100) continues to receive data over the SN (400) between T1 and T2. Consider, the N310 is out of synchronization state, the UE (100) initiates the recovery procedures and performs the cell selection to find the suitable cell. Once the suitable cell is found, the T311 is stopped and T301 is started for triggering RRE. The UE (100) indicates the RLF Recovery Success/Fail at T3. The UE (100) indicates the RLF Recovery Success/Fail at T3. The T301 stops when RA is successful and the T301 expires when RA fails.

Figure 15:
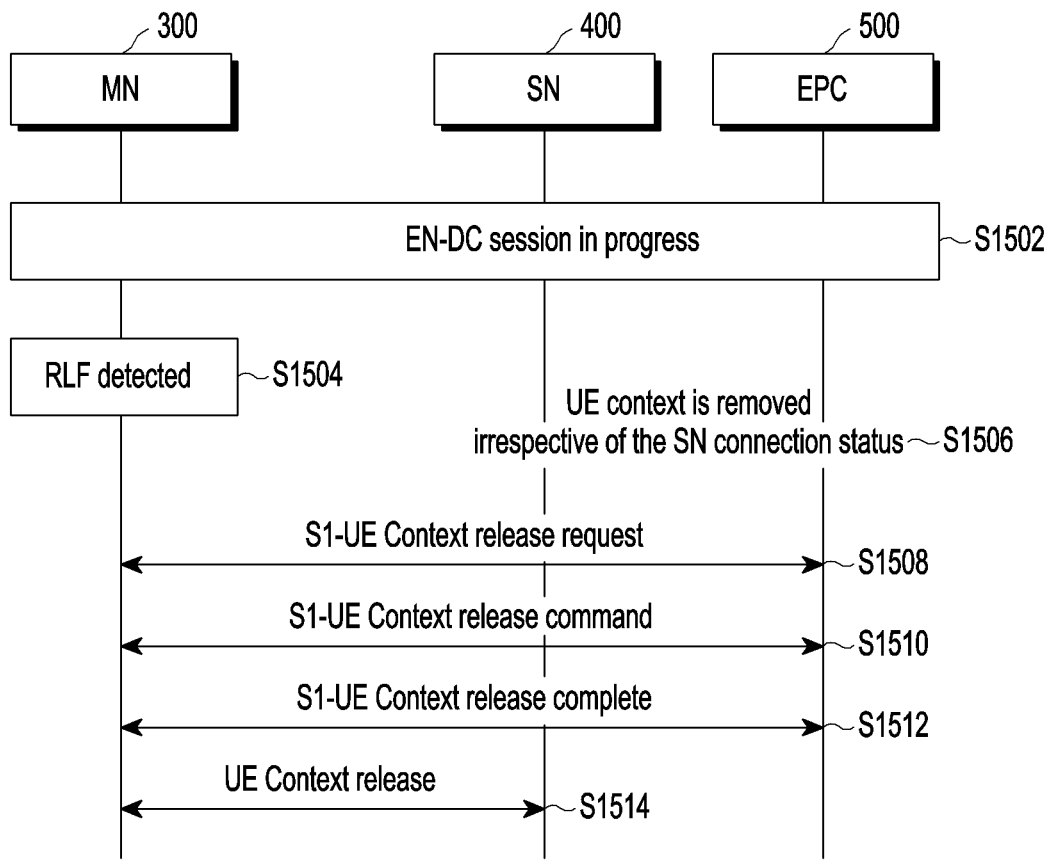
FIG. 15 is another sequential diagram illustrating various operations for handling the RLF in the MRDC system, according to prior art.

FIG. 15 is another sequential diagram illustrating various operations for handling the RLF in the MRDC system (1000), according to prior art.

At S1502, the EN-DC session in progress between the MN (300), SN (400) and an EPC (500). At S1504, the MN (300) detects the RLF. At S1506, the UE context is removed irrespective of the SN connection status. At S1508, a S1-UE context release request is exchanged between the MN (300) and EPC (500). At S1510, S1-UE context release command is exchanged between the MN (300) and EPC (500). S1512, S1-UE Context release complete is exchanged between the MN (300) and EPC (500). S1514, UE Context release is exchanged between the MN (300) and the SN (400).

Figure 16:
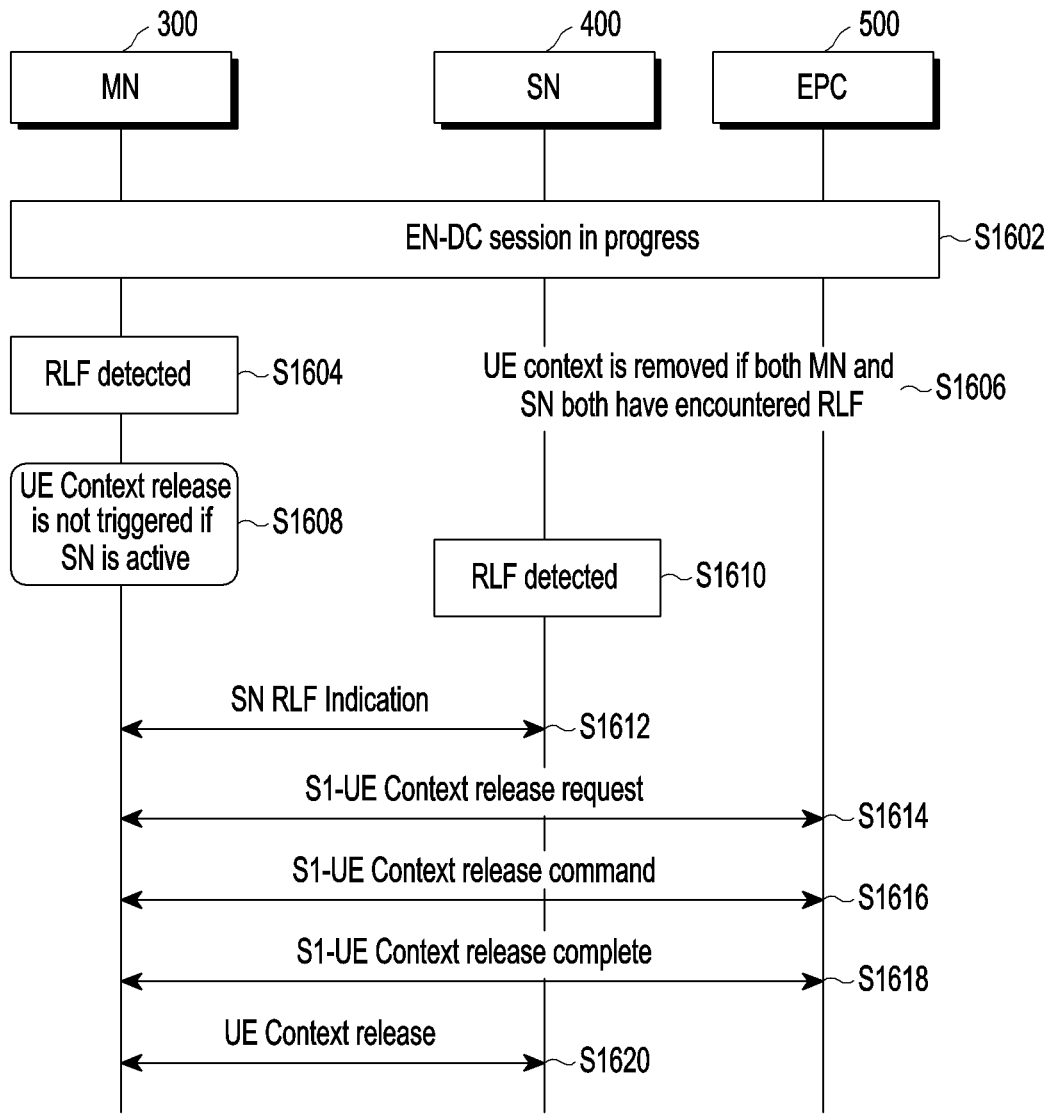
FIG. 16 is another sequential diagram illustrating various operations for handling the RLF in the MRDC system, according to the embodiments as disclosed herein.

FIG. 16 is another sequential diagram illustrating various operations for handling the RLF in the MRDC system (1000), according to the embodiments as disclosed herein.

At S1602, the EN-DC session in progress among the MN (300), the SN (400) and the EPC (500). At S1604, the MN (300) detects the RLF. At S1606, the UE context is removed if both MN (300) and SN 300 have encountered RLF. At S1608, UE Context release is not triggered at the MN (300) if the SN (400) is active. At S1610, the SN (400) detects the RLF. At 1612, the SN RLF Indication is exchanged between the MN (300) and the SN (400). At S1614, a S1-UE context release request is exchanged between the MN (300) and EPC (500). At S1616, S1-UE context release command is exchanged between the MN (300) and EPC (500). S1618, S1-UE Context release complete is exchanged between the MN (300) and EPC (500). S1620, UE Context release is exchanged between the MN (300) and the SN (400).

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What claimed is:

1. A method for handling Radio Link Failure (RLF) in a Multiple Radio Access Technology (Multi-RAT) Dual Connectivity (MRDC) system including a User Equipment (UE)

connected to a Master Node (MN) and at least one Secondary Node (SN), the method comprising:
  detecting, by the UE, an RLF with the MN;
  after detecting the RLF with the MN, determining, by the UE, whether an SN termination condition for terminating a connection with an SN of the at least one SN is met, wherein the SN termination condition comprises receiving a Radio Resource Control (RRC) release message related to the SN at the UE;
  after detecting the RLF with the MN, initiating, by the UE, an RRC connection re-establishment procedure for the MN and a first timer related to the RRC connection re-establishment procedure for the MN,
  maintaining, by the UE, the connection with the SN, in response to determining that the SN termination condition is not met; and
  releasing, by the UE, the connection with the SN, in response to determining that the SN termination condition is met or the first timer being expired,
  wherein context of the UE is maintained by the MN for a time period longer than a duration of the first timer, after detection of the RLF with the MN.

2. The method of claim 1, further comprising:
  continuing, by the UE, data activity with the at least one SN without releasing the connection until the SN termination condition is met.

3. The method of claim 2, wherein continuing the data activity with the at least one SN comprises:
  receiving, by the UE, from the MN, information about Data Radio Bearers (DRBs) to be used for continuing the data activity; and
  continuing, by the UE, the data activity with the at least one SN using the DRBs indicated by the MN.

4. The method of claim 1, wherein the SN termination condition further comprises at least one of detecting an expiration of a second timer, detecting a stop of the second timer, receiving a re-configuration message at the UE, receiving a new SN configuration, completing an SN data activity at the at least one SN, and detecting an RLF at the at least one SN.

5. A method for handling Radio Link Failure (RLF) in a Multiple Radio Access Technology (Multi-RAT) Dual Connectivity (MRDC) system including a User Equipment (UE) connected to a Master Node (MN) and at least one Secondary Node (SN), the method comprising:
  detecting, by the MN, an RLF with the UE;
  after detecting the RLF with the UE, preserving, by the MN, a context of the UE for a particular time period;
  determining, by the MN, whether an SN termination condition for terminating a connection between the UE and an SN of the at least one SN is met, wherein the SN termination condition comprises receiving a Radio Resource Control (RRC) release message related to the SN at the UE;
  continuing, by the MN, data activity with the SN until the SN termination condition is met, in response to determining that the SN termination condition is not met; and
  stopping, by the MN, the data activity with the SN, in response to determining that the SN termination condition is met,
  wherein after the UE detecting the RLF with the MN, the UE initiated an RRC connection re-established procedure for the MN and a first timer related to the RRC connection re-established procedure for the MN,
  wherein the MN maintains context of the UE for a time period longer than a duration of the first timer, after detecting the RLF with the UE.

6. The method of claim 5, further comprising:
  performing, by the MN, an RLF recovery;
  determining, by the MN, at least one Data Radio Bearer (DRB) to be used by the UE for continuing the data activity from the UE to the at least one SN while the MN is performing the RLF recovery; and
  indicating, by the MN, the at least one DRB to the UE associated with the MN.

7. The method of claim 5, wherein the SN termination condition further comprises at least one of detecting an expiration of a timer, detecting a stop of the timer, receiving a re-configuration message at the UE, receiving a new SN configuration, completing SN data activity at the at least one SN, and detecting an RLF at the at least one SN.

8. A User Equipment (UE) for handling Radio Link Failure (RLF) in a Multiple Radio Access Technology (Multi-RAT) Dual Connectivity (MRDC) system including a Master Node (MN) and at least one Secondary Node (SN), the UE comprising:
  a transceiver; and
  at least one processor coupled to the transceiver, wherein the at least one processor is configured to:
    detect an RLF with the MN,
    after detecting the RLF with the MN, determine whether an SN termination condition for terminating a connection with an SN of the at least one SN is met, wherein the SN termination condition comprises receiving a Radio Resource Control (RRC) release message related to the SN at the UE,
    after detecting the RLF with the MN, initiate a first timer and an RRC connection re-established procedure for the MN,
    maintain the connection with the SN, in response to determining that the SN termination condition is not met, and
    release the connection with the SN, in response to determining that the SN termination condition is met the first timer being expired,
  wherein context of the UE is maintained by the MN for a time period linger than a duration of the first timer, after detection of the RLF with the MN.

9. The UE of claim 8, wherein the at least one processor is further configured to:
  continue data activity with the at least one SN, without releasing the connection until the SN termination condition is met.

10. The UE of claim 9, wherein to continue the data activity with the at least one SN, the at least one processor is further configured to:
  receive, from the MN, information about a Data Radio Bearer (DRB) to be used, for continuing the data activity, and
  continue the data activity with the at least one SN using the DRB indicated by the MN.

11. The UE of claim 8, wherein the SN termination condition further comprises at least one of an expiration of a second timer, detecting a stop of the second timer, receiving a re-configuration message at the UE, receiving a new SN configuration, completing SN data activity at the at least one SN, and detecting an RLF at the at least one SN.

12. A Master Node (MN) for handling Radio Link Failure (RLF) in a Multiple Radio Access Technology (Multi-RAT) Dual Connectivity (MRDC) system including a User Equipment (UE) connected to the MN and at least one Secondary Node (SN), the MN comprising:
  a transceiver; and
  at least one processor coupled to the transceiver, wherein the at least one processor is configured to:
    detect an RLF with the UE,
    after detecting the RLF with the UE, preserve a context of the UE for a particular time period, determine whether an SN termination condition for terminating a connection between the UE and an SN of the at least one SN is met, wherein the SN termination condition comprises receiving a Radio Resource Control (RRC) release message related to the SN at the UE,
    continue data activity with the SN until the SN termination condition is met, in response to determining that the SN termination condition is not met, and
    stop the data activity with the SN, in response to determining that the SN termination condition is met,
  wherein after the UE detecting the RLF with the MN, the UE initiates an RRC connection re-established procedure for the MN and a first timer related to the RRC connection re-established procedure for the MN,
  wherein the MN maintains context of the UE for a time period longer than a duration of the first timer, after detecting the RLF with the UE.

13. The MN of claim 12, wherein the at least one processor is further configured to:
  perform an RLF recovery,
  determine at least one Data Radio Bearer (DRB) to be used by the UE for continuing the data activity from the UE to the at least one SN while the MN is performing the RLF recovery, and
  indicate the at least one DRB to the UE associated with the MN.

14. The MN of claim 12, wherein the SN termination condition comprises at least one of detecting an expiration of a timer, detecting a stop of the timer, receiving a re-configuration message at the UE, receiving a new SN configuration, completing SN data activity at the at least one SN, and detecting an RLF at the at least one SN.

* * * * *